3,697,445
HIGH SURFACE AREA NICKEL CATALYST
James L. Carter, Chatham, N.J., assignor to Esso Research and Engineering Company
No Drawing. Continuation-in-part of application Ser. No. 717,903, Apr. 1, 1968. This application Oct. 6, 1970, Ser. No. 78,601
Int. Cl. B01j *11/32, 11/34*
U.S. Cl. 252—452                    12 Claims

ABSTRACT OF THE DISCLOSURE

A stabilized high surface area nickel catalyst which is particularly useful for removing trace quantities of oxygen from inert gases is described. The nickel-silica catalyst has a nickel surface area greater than 70 m.$^2$/g. and a total surface area in the range of about 225 m.$^2$/g. to about 300 m.$^2$/g. The active catalyst contains from about 25 wt. percent to about 50 wt. percent nickel and of its total silica content 30 to 90 wt. percent is derived from precipitated silicate ions.

CROSS REFERENCES

This application is a continuation-in-part of application Ser. No. 717,903 filed Apr. 1, 1968, now abandoned.

BACKGROUND OF THE INVENTION

In many applications which make use of inert gases, such as nitrogen and argon, it is extremely important that the gas be delivered essentially free of oxygen. For example, it is not uncommon that customer requirements dictate oxygen concentrations of less than 2 parts per million (hereinafter referred to as p.p.m.) of oxygen in the inert gas. Typical applications calling for such low oxygen contents are, for example, the melt spinning of nylon and the welding of titanium.

In the past, two main types of systems for removing trace amounts of oxygen have enjoyed commercial usage. In one type of system the oxygen is removed by reaction with either a supported copper catalyst or with manganous oxide. In both cases the catalyst must be used at 200° C. or above. This, of course, means that the entire gas stream being purified must be heated to this temperature. The other system currently employed uses a conventional palladium catalyst. However, this system requires the addition of hydrogen and either continuous monitoring of the excess hydrogen or tolerating the excess hydrogen. In addition, the use of certain nickel catalyst has been suggested and used for the removal of oxygen by reaction with the reduced metal. However, here again, these catalysts are limited in their usefulness by low capacity at room temperature and also by their poor thermal stability.

In marketing and utilization of inert gases, a final purification of the gas at a customer's receiving facility is a highly desirable feature; therefore, a reactor which would be compact, light weight and require a minimum of instrumentation and attention while operating, preferably at room ambient temperature or below, would be a well-received article. To minimize the cost of removing contaminant oxygen from nitrogen, argon, etc., the requirements for such a reactor include: (1) a high capacity of the system for removing oxygen at ambient and lower temperatures; (2) long catalytic life, i.e. the catalyst is capable of a large number of regenerations per charge; and (3) the length of activity between regenerations should be of sufficient duration.

The process of the instant invention may be used in such a reactor designed to meet the above requirements and is capable of superior performance at temperatures of −70° C. and lower.

It will be appreciated that low temperature activity is extremely important in this area, in that some inert gases are transported in liquefied form and thus are at extremely low temperatures even after they are vaporized. The low temperature activity of the catalyst herein to be further described obviates the necessity of heating the gas to be purified to 200° C. or higher, or for that matter to temperatures above ambient.

SUMMARY OF THE INVENTION

The instant invention discloses a process using a high nickel metal surface area catalyst which has a high capacity for oxygen removal at ambient and lower temperatures. The catalyst used in the process has a nickel surface area in excess of 45 square meters per gram. In a particularly preferred process, the catalyst of the instant invention, which has a nickel surface area greater than 70 square meters per gram, is utilized for oxygen removal. Such high nickel metal surface area catalysts have excellent thermal stability and are easily reduced by exposure to flowing hydrogen at temperatures of 200° to 500° C. for a period of about two hours. Oxygen may be removed from the gas to be purified down to the limits of detectability, i.e. about 0.2 p.p.m. with these catalysts. Furthermore, when the catalyst is exhausted, it is readily reactivated by hydrogen reduction as described above.

The improved catalyst of this invention, to be hereinafter further discussed, is a solid nickel-silica catalyst having a stabilized high nickel surface area greater than 70 square meters per gram of catalyst and a total surface area of about 225 to about 300 square meters per gram of the catalyst in activated condition. The catalyst is prepared by precipitating the nickel and silicate ions from solution as nickel hydrosilicate, nickel carbonate and nickel hydroxide onto porous silica particles such as kieselguhr, for example, in such proportions that the activated catalyst contains 25 to 50 wt. percent nickel and under conditions of dilution such that high concentrations of dissolved nickel are never present in solution with dissolved silicate. Of its total silica content, 30 to 90 wt. percent thereof is derived from the precipitated silicate ions. The catalyst is activated by calcining in air the particles of porous silica and their associated deposit of nickel hydrosilicate, nickel carbonate and nickel hydroxide at a temperature in the range of from about 300° to 450° C. and then reducing with hydrogen the resulting calcined solids at 200° to 500° C. for several hours.

Thus, an object of the instant invention is to provide an improved catalyst for use as an oxygen "getter," which catalyst has superior removal capabilities at temperatures of ambient and below.

Still another object is to provide a novel high metal surface area catalyst comprising nickel and silica on a silica support.

Yet another object is to provide an improved process for preparing high surface area metal catalysts.

Further objects as well as a fuller understanding of the instant invention may be had by referring to the following detailed description.

Investigations have shown that the activity of catalysts of the type hereinabove discussed is directly related to the active nickel surface area in the catalyst. In accordance with the present invention, it is possible to produce nickel-silica catalysts which have higher nickel surface area than those heretofore available. (Nickel surface area can be expressed as area per unit weight of nickel or per unit weight of the total catalyst, square meters per gram.) The total silica content of the catalyst of the instant invention can be maintained at a certain level to include the silica from both the coprecipitated silicate and from the kieselguhr (or other source of porous solid silica such as infusorial, diatomaceous or siliceous earth). The improved catalyst of this invention can be made so as to result in nickel surface areas greater than 70 square meters per gram and generally in the range of from about 75 to about 100 square meters per gram of catalyst with a total surface area of 225 to about 300 square meters per gram of catalyst.

The process of making the high surface, high activity catalyst in accordance with the present invention comprises preparing an aqueous mixture of silicate anion, catalytic metal cation and porous silica particles under conditions of dilution such that the amount of dissolved metal in the mixture will be exceedingly low and in general well below 0.60 mole/liter of aqueous mixture. This can be accomplished simply by using sufficient water so the total amount of metal cation employed in preparing the aqueous mixture is below 0.60 mole/liter. Preferably the total amount of metal cation employed in this instance will be in the range of about 0.40 to about 0.55 mole/liter based on the total mixture.

In a particularly preferred method of preparing the catalyst of this invention, the total amount of catalytic metal cation used in preparing the aqueous mixture is in excess of 0.60 mole/liter; however, separate solutions of metal cation and silicate anion are added at a constant rate to a slurry of porous silica particles. Since metal and silicate ions precipitate onto the porous particles when the two solutions are commingled, the amount of dissolved metal cation in the aqueous mixture is kept exceedingly low. Indeed, in accordance with this invention dissolved metal in the aqueous mixture is kept below 0.60 mole/liter.

Sources of silicate anion are alkali metal silicate and silicic acid, for example. Porous silica particles include kieselguhr, diatomaceous earth and the like; but, other porous substances such as alumina, silica-alumina and zeolite may be used.

The preferred catalytic metal of interest is, of course, nickel, but other catalytic metals having high oxygen-getting activity may be used in the oxygen removal process. Iron, cobalt and copper are such metals.

Nickel salts such as nickel nitrate and nickel chloride are particularly useful in the preparation of the nickel catalyst of this invention.

As mentioned previously, the active nickel catalyst containing 25 to 50 wt. percent nickel is prepared with 30 to 90 wt. percent of its total silica content derived from precipitated silicate ions. Preferably 50 to 70% of the total silica content is derived from silicate ions. When about 65% of the silica derives from silicate ions, the mole ratio of nickel to silicate employed ranges from about 0.75:1 to about 1.75:1.

Returning now to the preparative steps, the aqueous mixture prepared as described above is heated to its boiling point and a water-soluble alkaline precipitating compound such as ammonium bicarbonate is added. Hydroxides, carbonates and bicarbonates of sodium, potassium and ammonium may be used as precipitants also. The alkaline ammonium precipitants are, however, most suitable for minimizing the amount of alkali metal residue which has to be removed by washing to avoid poisoning action on the finished catalyst.

Subsequently, the catalyst is recovered, calcined in an air followed by heating in contact with a reducing gas such as hydrogen.

EXAMPLE 1

In this example, a catalyst having a 79 m.$^2$/g. nickel surface area and 243 m.$^2$/g. total surface area was prepared as follows: 750 g. of Ni(NO$_3$)$_2$·6H$_2$O and 380 g. of Na$_2$SiO$_3$·9H$_2$O were added together to 50 g. of acid washed kieselguhr slurried in 4.5 liters of water. Thus, the maximum amount of dissolved nickel that could be present in the solution was below 0.6 mole/liter and the reaction is effectively conducted under conditions of dilution avoiding high concentrations of dissolved nickel. The solution was stirred and heated to its boiling point. Then 800 g. of ammonium bicarbonate was slowly added. After stirring several hours the solid was recovered, washed with boiling water and dried at 110° C. The dried material was calcined in air and then heated at about 400° C. in a stream of hydrogen for several hours to provide a highly active catalyst.

EXAMPLE 2

According to the preferred procedure of catalyst preparation, a nickel combined silicate and kieselguhr catalyst was prepared as follows: 1125 grams of Ni(NO$_3$)$_2$·6H$_2$O was dissolved in 2.25 liters of water and 380 grams of sodium metasilicate was dissolved in another 2.25 liters. To the sodium metasilicate solution 50 grams of acid washed kieselguhr was slurried. The nickel containing solution was heated slightly back to room temperature, since this solution forming procedure is endothermic. This solution was slowly added to the sodium metasilicate, kieselguhr solution while rigorously stirring the latter. The mixture was brought to the boiling point and 800 grams of ammonium bicarbonate was slowly added with continuous stirring. The resulting mixture was then kept at the boiling point while being stirred for approximately three hours. The mixture was then filtered and the precipitate was washed three times, using two liters of boiling water for each wash. The precipitate was then dried at 110° C. for 16 hours and then calcined for four hours at 400° C. The calcination converts the nickel salts to the oxide form. The calcined solid material analyzed 49.9% nickel and had a total surface area of 249 m.$^2$/g. The catalyst was reduced in flowing hydrogen by gradually raising its temperature at a rate of approximately 10° C. per minute until it reached a temperature of about 370° C., at which point it was held for two hours. The nickel surface area of the reduced catalyst was 90 m.$^2$/g. of catalyst.

The above procedure, and in particular the amount of water used and the preparation of two separate solutions which are then added, is believed responsible for producing the exceptionally high and desirable metal surface area. Thus, when adding the Ni(NO$_3$)$_2$·6H$_2$O solution to the sodium metasilicate-kieselguhr solution, a precipitate is being formed; and this is being accomplished in an environment which does not contain a high concentration of dissolved nickel. In addition, at the point of precipitation the water-to-solids ratio is high. Both of these factors tend to reduce the plugging of the pores of the silica matrix of the kieselguhr, which in turn would reduce the effective surface area.

In the following examples illustrating the effectiveness of the instant catalyst, space velocity is given in terms of volume of feed gas/hour/volume of catalyst (hereinafter referred to as v./hr./v.).

EXAMPLE 3

The catalyst prepared in Example 2 was tested at room temperature as follows: A feed containing 310 p.p.m. O$_2$ was passed through a two inch thick bed of the catalyst at a space velocity of 4,230. The oxygen content of the exit gas was reduced to 0.2 to 0.5 p.p.m. Removal of oxygen so as to produce outlet oxygen concentrations of less than 1 p.p.m. continued for 6 hours. At this point the cumulative removal (capacity) was equivalent to 8.7 liters of oxygen per kilogram of catalyst. It is to be noted that as used here the term "capacity" is used to denote the cumulative removal of oxygen under the conditions of specific run conditions and does not refer to the reaction of oxygen with all of the nickel present. It is to be appreciated that at lower space velocities, a larger fraction of the inlet oxygen is removed.

EXAMPLE 4

To establish the superior low temperature capabilities of the catalyst of this invention in the oxygen removal process described herein, the catalyst prepared in Example 2 was tested at −70° C. At a space velocity of 4,300 and using a test feed containing 290 p.p.m. of oxygen, the capacity of the catalyst was 5.75 liters of oxygen removed/kilogram of catalyst. The room temperature capacity under similar test conditions was found to be 8.9 liters $O_2$/kilogram of catalyst. Therefore, the system retained 65% of its room temperature capacity at this extremely low temperature. For purposes of comparison a prior art oxygen removal catalyst having a room temperature capacity of about four liters/kilogram lost 75% of its room temperature capacity when operated at this temperature.

EXAMPLE 5

The catalyst prepared in Example 2 was tested at room temperature to establish whether there are any significant adverse effects on the oxygen removal capacity which might be caused by the impurities which are likely to be encountered in commercial applications of the instant process. A run was made with a feed which contained 27 p.p.m. water, 164 p.p.m. methane, 150 p.p.m. carbon dioxide and 300 p.p.m. oxygen with the balance being nitrogen. The capacity at breakthrough (breakthrough being defined as the point at which the oxygen in the treated gas reaches the 1 p.p.m. level) was 6.7 liters of oxygen/kilogram of catalyst. At the same space velocity, the same catalyst had a capacity of 7.8 liters in the absence of the above listed impurities. Thus, the capacity in the run with impurities is about 86% of the normal capacity; and, thus, these impurities do not appear to have any significant adverse effects.

EXAMPLE 6

With regard to catalyst life, no loss in oxygen capacity is experienced through a multiple of cycles of oxidation and subsequent reduction. Thus with a fresh charge of catalyst prepared as indicated in Example 2, and using a feed containing 110 p.p.m. of oxygen at a space velocity of 6,630, the capacity at breakthrough was 6.5 liters/kilogram. After eight cycles in which the catalyst feed was run to breakthrough and then re-reduced for the next run, the catalyst had a capacity of 6.6 liters of oxygen/kilogram of catalyst.

Concerning the ultimate oxygen removal of the catalyst, it appears that at space velocities of the order of 4000 v./hr./v. or less and at room temperature, the removal capacity corresponds to what would be expected if a reaction of oxygen with all of the surface nickel atoms in a ratio of 1 oxygen atom per nickel atom took place. Using hydrogen chemisorption to determine the active metal surface area, it was found that the capacity of a monolayer of the metal was approximately 19.3 liters/kilogram. In experimental runs made at a space velocity of 4,750, in which the run was conducted until the outlet oxygen content was equal to the inlet oxygen, the total capacity was determined to be approximately 21.0 liters/kilogram. This value is within ±15% of the monolayer capacity as determined by the hydrogen chemisorption, and this is considered to be good agreement between these two methods.

EXAMPLE 7

The catalyst and process of the instant invention was tested against the oxygen removal capacity of currently available commercial systems. Using a space velocity of 3,000 and at a temperature of 25° with a nitrogen feed gas containing 350 p.p.m. of oxygen, the following results were obtained.

| Catalyst: | Capacity of catalyst (liters $O_2$/kg. catalyst) at breakthrough |
|---|---|
| Instant invention | 9 |
| Prior art supported copper catalyst | 4 |
| Prior art nickel catalyst | 3.2 |

The extremely high oxygen removal efficiency of the instant catalyst at both ambient and subambient temperature renders it particularly useful in processes for the final cleaning of gaseous product at a customer's receiving facility. The importance of subambient temperature oxygen removal will be readily appreciated by those skilled in the art, since at typical customer site installations, the gas to be purified is often delivered and stored as liquid in insulated cryogenic tanks. As gas is needed by the customer, the liquefied gas is drawn from the tank and vaporized in a vaporizer. For the final purification herein visualized, the catalyst is placed in a suitable reactor which is positioned in a line leaving the vaporizer. In normal operations the liquefied gas will be withdrawn from the cryogenic tank at a steady rate, with the vaporizer warming it to ambient temperature before it enters the catalytic reactor. However, experience shows that customers frequently may withdraw liquefied gas at rates up to five times the average for short periods of time. This occurs, for example, in synthetic fibers (e.g., nylon) processing where ultrahigh purity nitrogen is used for blanketing. When nylon processing equipment is open for cleaning, for example, it is flooded with nitrogen at a high rate to prevent the ingress of air. Under these conditions the vaporized gas will enter the catalyst reactor at a subambient temperature because normally vaporizers of the type referred to are designed for average expected flow rates. Since the system of the instant invention retains its oxygen removal capacity at low temperatures, it is able to continue to supply gas virtually free of oxygen even under these conditions and, hence, it is of extreme value as a final clean-up reactor in processes similar to the one just described.

It will be appreciated by those skilled in the art that the use above described is just one example of many possible uses. Other uses include, for example, the final cleaning of a gaseous pipeline product from onsite air separation plants and the cleaning of gases prior to charging them into cylinders or tube trailers.

It will be further appreciated that in some applications it will not prove advantageous or necessary to vaporize a liquefied gaseous product prior to the final cleaning operation. For example, should a quantity of stored liquefied gas somehow become contaminated, it may be purified by simply recirculating the contaminated liquid through the catalyst reactor until it has reached the desired degree of purity. Typical examples of gases stored as liquids which may become contaminated include liquid nitrogen and liquid argon.

Accordingly, reference should be had to the following appended claims in determining the full scope of the invention.

What is claimed is:

1. A nickel-silica catalyst having a nickel surface area greater than 70 m.$^2$/g. of catalyst.

2. The catalyst of claim 1 wherein said catalyst has a total surface area greater than 225 m.$^2$/g. of catalyst.

3. The catalyst of claim 2 wherein said nickel content is from about 25 wt. percent to about 50 wt. percent based on the total weight of catalyst in active form.

4. A nickel-silica catalyst having a porous silica support; a nickel surface area of 75 m.$^2$/g. to 100 m.$^2$/g.; a total surface area of about 225 m.$^2$/g. to about 300 m.$^2$/g.; and, a nickel content of about 25 wt. percent to about 50 wt. percent based on the total weight of catalyst in active form.

5. The catalyst of claim 4 wherein the porous silica support is selected from the group consisting of kieselguhr and diatomaceous earth.

6. A process for making a nickel-silica catalyst which comprises: (a) preparing an aqueous mixture containing nickel ions, silicate ions and porous silica particles in proportions sufficient to provide from about 25 wt. percent to about 50 wt. percent nickel based on the total weight of nickel and silica in the activated catalyst, and under conditions of dilution such that the amount of dissolved nickel in said aqueous mixture is below 0.60 mole/liter; (b) adding alkaline bicarbonate to said aqueous mixture to precipitate dissolved nickel and dissolved silicate ions onto said porous particles; and thereafter, (c) activating said particles by calcining in air followed by heating in the presence of a reducing gas.

7. The process of claim 6 wherein said aqueous mixture is prepared by adding water to nickel nitrate, sodium metasilicate and porous silica in an amount sufficient so that the total concentration of nickel in said mixture is in the range of 0.40 mole/liter to 0.55 mole/liter.

8. The process of claim 6 wherein the ratio of nickel to silicate in said mixture is from about 0.75:1 to about 1.75:1.

9. The process of claim 6 wherein the alkaline bicarbonate is ammonium bicarbonate.

10. The process of claim 6 including the step of heating said aqueous mixture to its boiling point.

11. The process of claim 6 wherein calcining in air is conducted at about 300° C. to about 450° C. and said heating is conducted in hydrogen at about 200° C. to about 500° C.

12. A process for making a nickel-silica catalyst which comprises:
(a) preparing an aqueous solution of sodium metasilicate;
(b) slurrying porous silica particles in the solution prepared in step (a);
(c) preparing an aqueous solution of nickel nitrate in an amount sufficient to provide from about 25 wt. percent to about 50 wt. percent nickel based on the total amount of nickel and silica in the activated catalyst;
(d) adding the solution prepared in step (c) to the mixture prepared in step (b) at a rate such that the amount of dissolved nickel in the combined materials is below 0.60 mole/liter;
(e) heating the mixture resulting from step (d) to its boiling point;
(f) adding ammonium bicarbonate to the heated mixture of step (e) to precipitate nickel and silicate ions from solution onto said porous particles;
(g) recovering said porous particles with their associated deposits of nickel and silicate salts;
(h) calcining said recovered particles in air at about 300° C. to about 450° C.; and
(i) reducing the product of step (h) with hydrogen at about 200° C. to about 500° C.

References Cited

UNITED STATES PATENTS

| | | | |
|---|---|---|---|
| 3,351,566 | 11/1967 | Taylor et al. | 252—452 |
| 3,371,050 | 2/1968 | Taylor et al. | 252—459 |
| 3,449,099 | 6/1969 | Taylor et al. | 252—459 X |

CARL F. DEES, Primary Examiner

U.S. Cl. X.R.

252—459